Nov. 21, 1950 S. V. WILSON 2,530,559
HEATED STEERING WHEEL FOR AUTOMOBILES
Filed Sept. 2, 1949 2 Sheets-Sheet 1
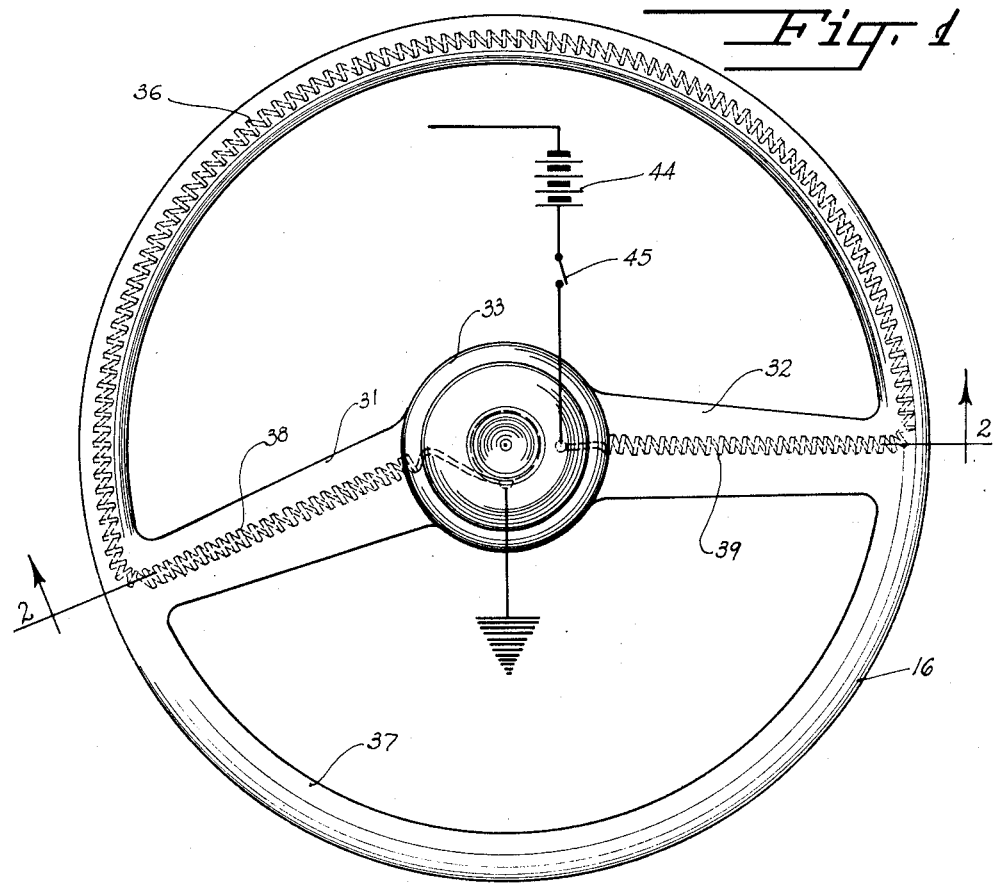
Fig. 1
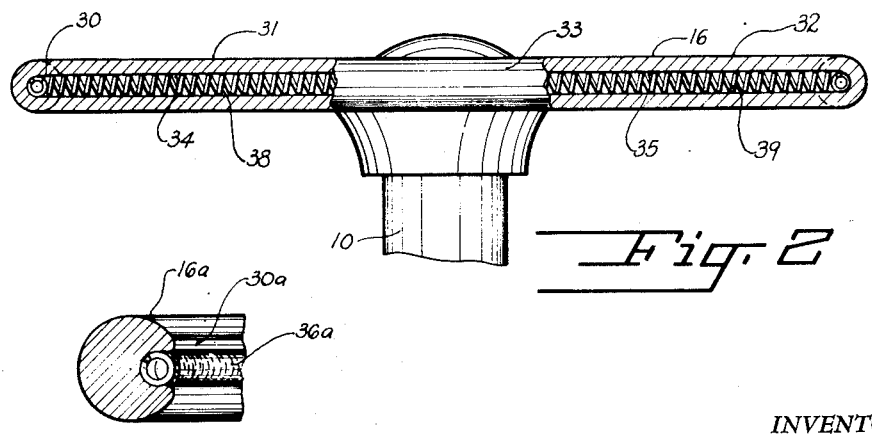
Fig. 2
Fig. 5
INVENTOR.
Sylvester V. Wilson
BY
Christian A. Nielsen
ATTORNEY INVENTOR
Sylvester V. Wilson
BY Christian L. Nielsen
ATTORNEY Patented Nov. 21, 1950

2,530,559

UNITED STATES PATENT OFFICE 2,530,559

HEATED STEERING WHEEL FOR AUTOMOBILES

Sylvester V. Wilson, Indianapolis, Ind.

Application September 2, 1949, Serial No. 113,723

3 Claims. (Cl. 219—19)

This invention relates to improvements in heating steering wheels for automotive vehicles.

An object of the invention is the provision of a new and improved steering wheel for automobiles, airplanes, or other mobile vehicles having a similar steering device having an electric resistance wire constructed as a unit and embodied therein for maintaining the temperature of the wheel during the winter months at a predetermined degree for the comfort of the driver or operator, the wire being disposed in a passage in the top semi-circular portion of the wheel with the terminals of said wire being mounted in protective passages in spokes for carrying said terminals to the hub of the wheel where they are connected with a source of current.

Another object of the invention is the provision of a heating arrangement for a steering wheel of an automobile, airplane or other mobile vehicle having a similar steering device in which an electric resistance wire is conducted through that portion of the wheel which is handled most by the operator, the wire being carried in a protected manner to the hub of the wheel where the ends of said wire terminate in connections with a source of current, the steering post forming a ground for one end, the steering wheel being formed of insulating materials.

A further object of the invention is the provision of a steering wheel provided with an insulated channel in a portion thereof to receive an electric resistance wire, the ground end of which is attachable to the steering wheel hub, the other end of which is attachable to a sleeve supported in the steering column and insulated therefrom, said sleeve being mounted within a second sleeve supporting the first mentioned sleeve and insulated therefrom, the second sleeve forming an electrical connection between a switch for the horn and the source of current.

A further object of the invention is the provision of a steering wheel in which the resistance wire unit and the connecting wires and other parts are molded into the wheel during the making thereof and not channeled in after the wheel has been constructed.

This invention is best understood from a consideration of the following detailed description taken in connection with the accompanying drawings forming a part of the specification, nevertheless, it must be borne in mind that the invention is not confined to the disclosure, but is susceptible of such changes and modifications as shall define no material departure from the salient features of the invention as expressed in the appended claims.

In the drawings:

Figure 1 is a top plan view of my improved heating steering wheel;

Figure 2 is a transverse vertical section taken on the line 2—2 of Figure 1;

Figure 5 is a fragmentary transverse vertical of a portion of the wheel showing a modified form.

Figure 3:
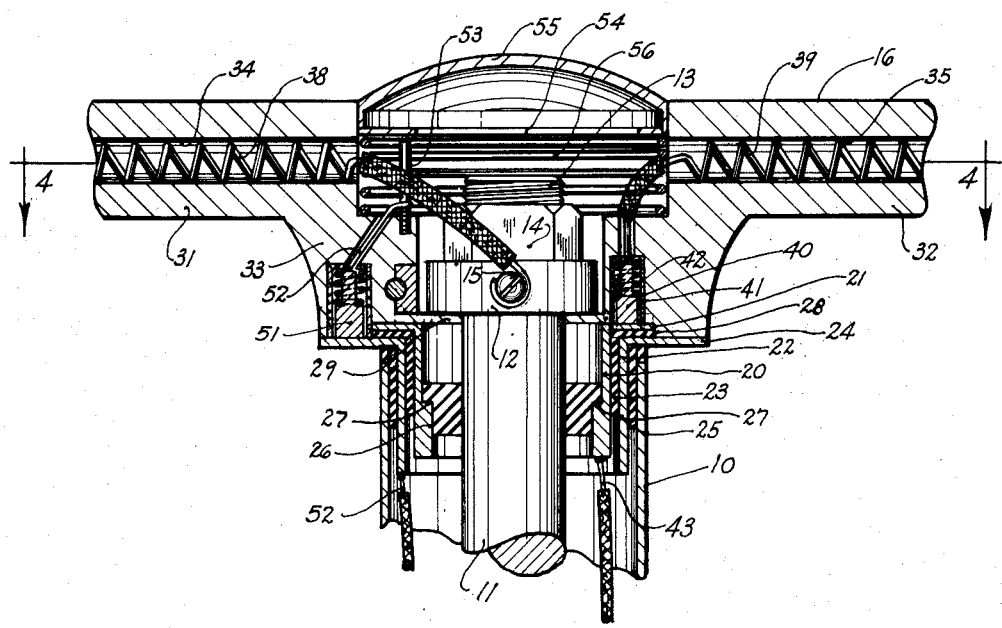
Figure 3 is a greatly enlarged fragmentary vertical section of the steering wheel and column taken along the line 3—3 of Figure 4 and showing the connections between an electric heating unit and a source of current.

Referring more particularly to the drawings, 10 designates a steering column in which is mounted a steering post 11. The post 11 has a flange 12 below a threaded upper end 13 upon which is screwed a nut 14. A bolt 15 is threaded into a passage in the flange. A steering wheel 16 is secured to the post which is mounted in bearings in the column.

A metal sleeve 20 has an annular flange 21 at the upper end thereof. The sleeve is insulated from a second sleeve 22 as shown at 23. The flange is insulated from and is supported by a flange 24 formed integrally with the sleeve 22. The second sleeve and its flange are insulated as shown at 25, from the steering column. A bearing 26 for the upper end of the post has an annular flange resting on a shoulder 27 on the sleeve 20, and an insulating disc 28 spaces a metal plate 29 from the flange 21. The post 11 passes through central openings in the plate 29 and disc 28.

Figure 4:
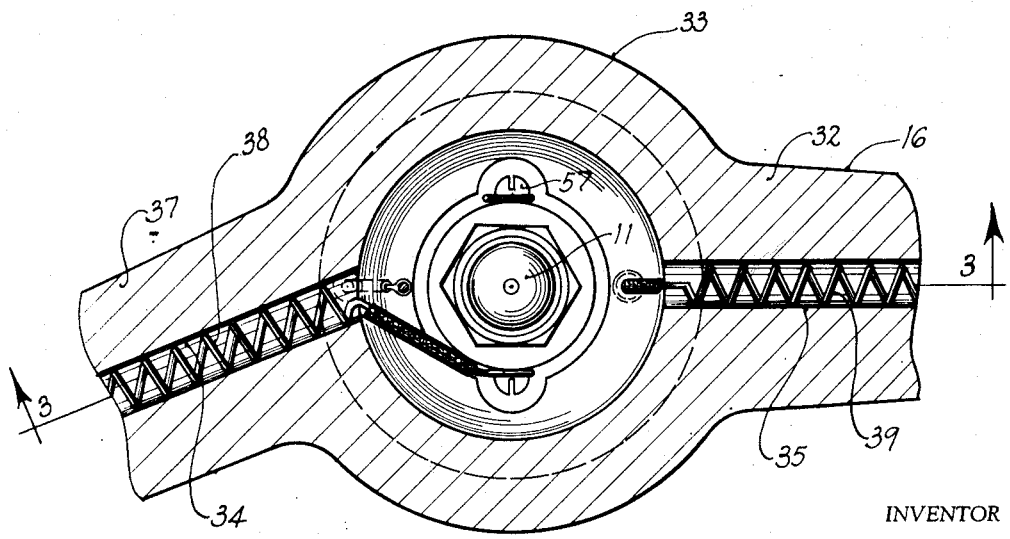
Figure 4 is a fragmentary enlarged horizontal section taken along the line 4—4 of Figure 3.

The steering wheel manufactured with an insulated channel has a substantially circular passage or channel 30 in the upper portion thereof where said wheel is grasped generally by the hands of the driver. These passages extend through spokes 31 and 32 to a hub-section 33 of the wheel as shown respectively at 34 and 35 in Fig. 2. A coiled resistance wire 36 is disposed in the circular passage 30 in the rim 37 of the wheel 16 and the ends 38 and 39 of said wire are located respectively in the spokes 31 and 32. The end 38 (Figures 3 and 4) is grounded on the bolt 15, or in some similar or suitable manner. The free end 39 of the resistance wire is carried inwardly and attached to a contact 40 mounted in a pocket 41 and retained in engagement with the flange 21 by a spring 42. An insulated wire 43, extending through the column 10 from the positive terminal of the battery 44 of the vehicle, is connected to the inner end of the sleeve 20. A switch 45 controls the circuit.

An insulated wire 50, housed by the column 10, is attached to the metal sleeve 22. The flange 24 of said sleeve is engaged by a spring pressed contact 51 mounted in a pocket in the hub 33 of the wheel at a diametrically opposite point from the pocket 40. A wire 52 connects the outer end of said contact with a metal pin 53 threaded into the hub 33. The outer free end of the pin is spaced normally from a metal flange 54 on a cap 55. A coil spring 56 maintains the cap outwardly and the flange 54 out of engagement with the pin 53 until the cap is depressed to close the circuit to the usual horn of the vehicle. One end of the spring is bolted at 57 (Figure 4) to the post 11 to provide a ground for the horn circuit.

In the modified form shown in Figure 5, the resistance wire 36a is located in a channel 30a in the wheel 16a, and the channel is closed and molded over with insulating material after installation of the unit.

During the winter months, the switch 45 is closed so that the wire 36 will heat the steering wheel. Thus, it will be possible for the operator of the vehicle to wear thinner gloves since the hands will be kept warm by the wheel; or, the operator may omit the gloves entirely.

What I claim is:

1. A steering wheel for automobiles, airplanes or other mobile vehicles having a similar steering device, having a rim connected to a hub by a pair of spokes, each spoke being provided with a passage leading from the rim to the hub, the upper portion of the rim between the outer ends of the spokes being provided with a substantially semi-circular passage having the ends thereof leading into adjacent ends of the passages in the spokes, an electric resistance wire in the passage in the rim with the ends of said wire projecting through the adjacently disposed spokes and into the hub, one end of the wire being grounded on the usual steering wheel hub, a sleeve within the hub, an annular flange fixed to the upper end of the sleeve and supported by the steering column for retaining the sleeve in position, said sleeve and flange being insulated from said column, a contact pin in the hub, a spring retaining the pin in engagement with the flange, the other end of the resistance wire being connected to the pin, and a wire connecting the sleeve with a source of current.

2. A unit of mechanism to be applied to and installed in the steering wheel of an automobile, airplane or other mobile vehicle having a similar steering device, having a resistance wire to be inserted in a channel constructed for such purpose in the upper portion of such steering wheel and one end of which resistance wire is, by means of suitable passage ways through the spokes of said wheel, grounded on such steering wheel hub, a sleeve within the hub, an annular flange fixed to the upper end of the sleeve and supported by the steering column for retaining the sleeve in position, said sleeve and flange being insulated from said steering column, a contact pin in the hub, a spring retaining the pin in engagement with the flange, the other end of the resistance wire being connected to the pin by suitable means and a wire connecting the sleeve with a source of current.

3. A steering wheel for automobiles, airplanes and other mobile vehicles having a similar steering device, having molded in the upper semi-circular portion thereof a resistance wire with the ends thereof extending into and molded into the adjacently disposed spokes of said wheel and to the hub of said wheel in such manner that one end thereof can be grounded by suitable means on the steering wheel hub, and having a sleeve within the hub insulated from the steering column and supported thereby, a wire extending from a source of current and connected with the sleeve and having a contact pin, and a spring retaining the pin in contact with the sleeve, the other end of the resistance wire being attached to the contact pin.

SYLVESTER V. WILSON.

REFERENCES CITED

The following references are of record in the file of this patent:

UNITED STATES PATENTS

| Number | Name | Date |
|---|---|---|
| 1,934,988 | May | Nov. 14, 1933 |
| 2,147,599 | Becker | Feb. 14, 1939 |